(12) United States Patent
Vives

(10) Patent No.: US 7,689,451 B2
(45) Date of Patent: Mar. 30, 2010

(54) SYSTEMS AND METHODS FOR MARKETING FINANCIAL PRODUCTS AND SERVICES

(75) Inventor: Andrés Felipe Vives, Arlington, VA (US)

(73) Assignee: Capital One Financial Corporation, Falls Church, VA (US)

( * ) Notice: Subject to any disclaimer, the term of this patent is extended or adjusted under 35 U.S.C. 154(b) by 2142 days.

(21) Appl. No.: 10/012,381

(22) Filed: Dec. 12, 2001

(65) Prior Publication Data

US 2003/0110074 A1 Jun. 12, 2003

(51) Int. Cl.
*G06F 17/30* (2006.01)
*G06Q 30/00* (2006.01)
*G06Q 40/00* (2006.01)

(52) U.S. Cl. .............................. 705/10; 705/14; 705/35
(58) Field of Classification Search .................. 705/35, 705/10, 14
See application file for complete search history.

(56) References Cited

U.S. PATENT DOCUMENTS

| 5,724,521 | A  | * | 3/1998  | Dedrick ........................ 705/26 |
| 5,764,975 | A  | * | 6/1998  | Taniguchi et al. .............. 707/6 |
| 6,026,397 | A  |   | 2/2000  | Sheppard |
| 6,134,532 | A  | * | 10/2000 | Lazarus et al. ........... 705/14.25 |
| 6,216,129 | B1 | * | 4/2001  | Eldering .................... 705/36 R |
| 6,298,348 | B1 | * | 10/2001 | Eldering .................... 705/36 R |
| 6,324,524 | B1 | * | 11/2001 | Lent et al. ...................... 705/38 |
| 6,336,104 | B1 | * | 1/2002  | Walker et al. .................. 705/38 |
| 6,560,578 | B2 | * | 5/2003  | Eldering .................. 705/14.39 |
| 6,611,842 | B1 | * | 8/2003  | Brown ........................ 707/102 |
| 6,816,857 | B1 | * | 11/2004 | Weissman et al. ............... 707/5 |
| 6,925,441 | B1 | * | 8/2005  | Jones et al. .................... 705/10 |
| 6,970,830 | B1 | * | 11/2005 | Samra et al. .................. 705/10 |
| 7,062,510 | B1 | * | 6/2006  | Eldering .................. 707/104.1 |
| 7,177,851 | B2 | * | 2/2007  | Afeyan et al. ................. 706/13 |
| 7,315,983 | B2 | * | 1/2008  | Evans et al. ................. 715/713 |
| 7,331,057 | B2 | * | 2/2008  | Eldering et al. ............... 725/32 |
| 7,406,456 | B2 | * | 7/2008  | Calistri-Yeh et al. .......... 706/55 |
| 7,424,439 | B1 | * | 9/2008  | Fayyad et al. ................. 705/10 |
| 7,472,088 | B2 | * | 12/2008 | Taylor et al. .................. 705/38 |
| 2001/0004733 | A1 | * | 6/2001  | Eldering ..................... 705/14 |
| 2001/0014868 | A1 | * | 8/2001  | Herz et al. .................... 705/14 |
| 2002/0069261 | A1 | * | 6/2002  | Bellare et al. ............... 709/218 |
| 2002/0111847 | A1 | * | 8/2002  | Smith, II ..................... 705/10 |
| 2002/0123928 | A1 | * | 9/2002  | Eldering et al. ............... 705/14 |
| 2002/0152106 | A1 | * | 10/2002 | Stoxen et al. .................. 705/8 |
| 2002/0194058 | A1 | * | 12/2002 | Eldering ..................... 705/10 |
| 2003/0004810 | A1 | * | 1/2003  | Eldering ..................... 705/14 |
| 2003/0046222 | A1 | * | 3/2003  | Bard et al. .................... 705/38 |
| 2003/0083970 | A1 | * | 5/2003  | Bigman et al. ................ 705/35 |
| 2005/0159996 | A1 | * | 7/2005  | Lazarus et al. ................ 705/10 |

\* cited by examiner

*Primary Examiner*—Jagdish N. Patel
*Assistant Examiner*—Kenneth L Bartley
(74) *Attorney, Agent, or Firm*—Finnegan, Henderson, Farabow, Garrett & Dunner, L.L.P.

(57) ABSTRACT

Systems and methods are provided for offering a financial product or service to a group of consumers. A first marketing pack for marketing a financial product or service to a group of consumers, where the first marketing pack has a first value for at least one marketing pack attribute, is selected. A second marketing pack having a second value for the at least one marketing pack attribute is then selected, such that the difference between the first value and the second value satisfies a predetermined marketing distance criteria. Thereafter, the financial product or service is offered to the group of consumers using the first marketing pack and the second marketing pack.

27 Claims, 7 Drawing Sheets

| Marketing Pack Type | Size | Degree of Stealthiness | Degree of Simplicity | Degree of Conciseness | Degree of Personalization |
|---|---|---|---|---|---|
| A | 4 | -7 | 1 | 2 | 8 |
| B | 3 | -4 | 3 | 4 | 6 |
| C | 3 | -4 | 4 | 7 | 4 |
| D | 6 | 2 | 7 | 8 | 3 |
| E | 10 | 3 | 8 | 10 | 1 |

FIG. 2

| | Financial Product | APR | Credit Limit | Annual Fee | Reward Type | Payment Date |
|---|---|---|---|---|---|---|
| 510 | | | 530 | 540 | 550 560 | 570 |
| 512 | AA | 6% | $5,000 | $30 | Airline Mileage | First Day of Every Month |
| 514 | BB | 9% | $9,000 | $10 | Gas Credits | Every Two Weeks |
| 516 | CC | 8% | $7,000 | $20 | Cash Back | Every Six Months |

FIG. 5

SYSTEMS AND METHODS FOR MARKETING FINANCIAL PRODUCTS AND SERVICES

BACKGROUND OF THE INVENTION

I. Field of the Invention

The present invention generally relates to marketing systems and methods for offering products or services, such as financial products and services. More particularly, the invention relates to systems and methods for providing complementary marketing of financial products and services to consumers.

II. Background and Material Information

The marketing of products and services, such as financial products and services, typically involves customer or marketing research. Generally, the focus of such research is to determine what types of products or services a majority of the population prefers. To this end, businesses use market-testing techniques, such as focus groups and other techniques, to determine the preferences of consumers.

Marketing research may also be performed to ascertain the best way of presenting an offer for a product or service. Thus, for example, various attributes of marketing material (such as a marketing pack or envelope sent to consumers) may be tailored to make it more attractive to a majority of the population. Such attributes may include the size, layout and/or colors for the marketing material, as well as the type, font, or color of the text used in the materials.

Typically, businesses will determine the attributes that make a particular marketing pack or envelope the most attractive to a majority of consumers and tailor it to the needs of that majority. However, tailoring such marketing materials to the majority of the population ignores other consumers, who may respond to other types of marketing packs or other types of products and services. Accordingly, there is a need for a system and method for providing marketing materials and offers for products and services in such a way that not only the majority of the consumer population is captured, but also the minority of consumers are targeted and captured.

SUMMARY OF THE INVENTION

Systems and methods consistent with embodiments of the present invention perform complementary marketing to generate incremental responders and, thereby, generate extra revenue.

In accordance with embodiments of the invention, systems and methods are provided for offering a financial product or service to a group of consumers. The financial product or service may be a credit card account, a savings or checking account, an installment or personal loan, an investment or brokerage service, or any other financial product or service. Further, the financial product or service may be offered to consumers through various channels of communication, including direct marketing, marketing over the Internet, and/or other means for communicating and offering financial products or services.

Consistent with embodiments of the invention, systems and methods are provided in which a first marketing pack is selected for marketing a financial product or service to a group of consumers, where the first marketing pack has a first value for at least one marketing pack attribute. The systems and methods then select a second marketing pack having a second value for the at least one marketing pack attribute such that a difference between the first value and the second value satisfies a predetermined marketing distance criteria. Thereafter, the systems and methods offer the financial product or service to the group of consumers using the first and second marketing packs.

In accordance with another embodiment of the invention, a method for offering a financial product or service is provided. According to the method, a first marketing pack for marketing the financial product or service to the group of consumers is selected, where the first marketing pack has a first value for at least one of a plurality of marketing pack attributes. The method then selects a second marketing pack having a second value for at least one of the plurality of marketing pack attributes such that a difference between the first and second values satisfies a predetermined marketing distance criteria. Thereafter, the method offers the financial product or service to the group of consumers.

According to another embodiment of the invention, a method is provided for offering a first financial product and a second financial product to a group of consumers. According to the method, a first financial product to be offered to the group of consumers is selected, where the first financial product has a first value for at least one financial product attribute. The method then selects a second financial product having a second value for the at least one financial product attribute such that a difference between the first value and the second value satisfies a predetermined marketing distance criteria. Thereafter, the method offers the first and second financial products to the group of consumers.

In accordance with still another embodiment of the invention, a method for offering a financial product to a group of consumers is provided. According to the method, a first financial product to be marketing to the group of consumers is selected, where the first financial product has corresponding values for a plurality of financial product attributes. The method then selects a second financial product having corresponding values for the plurality of financial product attributes such that a difference between corresponding values for the first and second financial products satisfy a predetermined marketing distance criteria.

In accordance with yet another embodiment of the invention, a system is provided for offering a financial product to a group of consumers. The system may include a database containing marketing pack selection data, and a memory that is operatively coupled to the database and which contains a marketing pack selection module. The system may further include a processor operatively coupled with the memory to perform the instructions contained in the marketing pack selection module. The processor may select a first marketing pack for marketing the financial product to the group of consumers, where the first marketing pack has a first value for at least one marketing pack attribute. The processor may also select a second marketing pack for marketing the financial product to the group of consumers, where the second marketing pack having a second value for the at least one marketing pack attribute such that a difference between the first value and the second value satisfies a predetermined marketing distance criteria.

In accordance with yet another embodiment of the present invention, a method for offering a financial product or service to a group of consumers is provided. According to the method, a first marketing pack for marketing the financial product or service to the group of consumers is selected, where the first marketing pack is selected to appeal to the majority of the group of consumers. The method then selects a second marketing pack for marketing the financial product or service to the group of consumers, where the second marketing pack is selected to appeal to the minority of the group of consumers. Thereafter, the method simultaneously offers the financial product to the group of consumers using the first marketing pack and the second marketing pack.

According to another embodiment of the invention, a method for offering a financial product or service to a group of consumers is provided. According to the method, a first marketing pack for marketing the financial product or service to the group of consumers is selected, where the first marketing pack has a first value for at least one marketing pack attribute. The method then selects a set of second marketing packs, each having a second value for the at least one marketing pack attribute such that a difference between the first value and the second value satisfies a predetermined marketing distance criteria. The method uses demographics data to identify a specific marketing pack out of the second set of marketing packs so that the largest number of consumers are likely to accept the offered financial product of service as a result of simultaneously using the first marketing pack and the identified specific marketing pack.

In accordance with yet another embodiment of the present invention, a system for offering a financial product or service to a group of consumers is provided. The system comprises means for selecting a first marketing pack for marketing the financial product or service to the group of consumers, where the first marketing pack has a first value for at least one marketing pack attribute. The system further comprises means for selecting a second marketing pack having a second value for the at least one marketing pack attribute, such that a difference between the first value and the second value satisfies a predetermined marketing distance criteria.

In accordance with yet another embodiment of the present invention, a system for offering a financial product or service to a group of consumers is provided. The system comprises means for selecting a first marketing pack for marketing the financial product or service to the group of consumers, where the first marketing pack has a first value for at least one of a plurality of marketing pack attributes. The system further comprises means for selecting a second marketing pack having a second value for at least one of the plurality of marketing pack attributes such that a difference between the first and second values satisfies a predetermined marketing distance criteria.

In accordance with still another aspect of the present invention, a system for offering a first financial product and a second financial product to a group of consumers is provided. The system comprises means for selecting a first financial product to be marketed to the group of consumers, where the first financial product has a first value for at least one financial product attribute. The system further comprises means for selecting a second financial product having a second value for the at least one financial product attribute such that a difference between the first value and the second value satisfies a predetermined marketing distance criteria.

In accordance with yet another embodiment of the invention, a computer-readable medium containing instructions for a method for offering a financial product or service to a group of consumers is provided. According to the method, a first marketing pack for marketing the financial product or service to a group of consumers is selected, where the first marketing pack has a first value for at least one marketing pack attribute. The method then selects a second marketing pack having a second value for the at last one marketing pack attribute, such that a difference between the first value and the second value satisfies a predetermined marketing distance criteria.

In accordance with yet another embodiment of the present invention, the computer-readable medium containing instructions for a method for offering a financial product or service to a group of consumers is provided. According to the method, a first marketing pack for marketing the financial product or service to the group of consumers is selected, where the first marketing pack has a first value for at least one of a plurality of marketing pack attributes. The method then selects a second marketing pack having a second value for at least one of the plurality of marketing pack attributes, such that a difference between the first and second values satisfies a predetermined marketing distance criteria.

In accordance with still another embodiment of the present invention, a computer-readable medium containing instructions for a method for offering a first financial product and a second financial product to a group of consumers is provided. According to the method, a first financial product to be marketed to the group of consumers is selected, where the first financial product has a first value for at least one financial product attribute. The method then selects a second financial product having a second value for the at least one financial product attribute such at a difference between the first value and the second value satisfies a predetermined marketing distance criteria.

Both the foregoing general description and the following detailed description are exemplary and are intended to provide further illustration and explanation of the invention as claimed.

BRIEF DESCRIPTION OF THE DRAWINGS

The accompanying drawings, which are incorporated in and constitute a part of this specification, illustrate various embodiments and aspects of the present invention. In the drawings:

FIG. 2 depicts an exemplary marketing pack selection table, consistent with embodiments of the present invention;

FIG. 5 is an exemplary financial product selection table, consistent with embodiments of the present invention;

DETAILED DESCRIPTION

Figure 1:
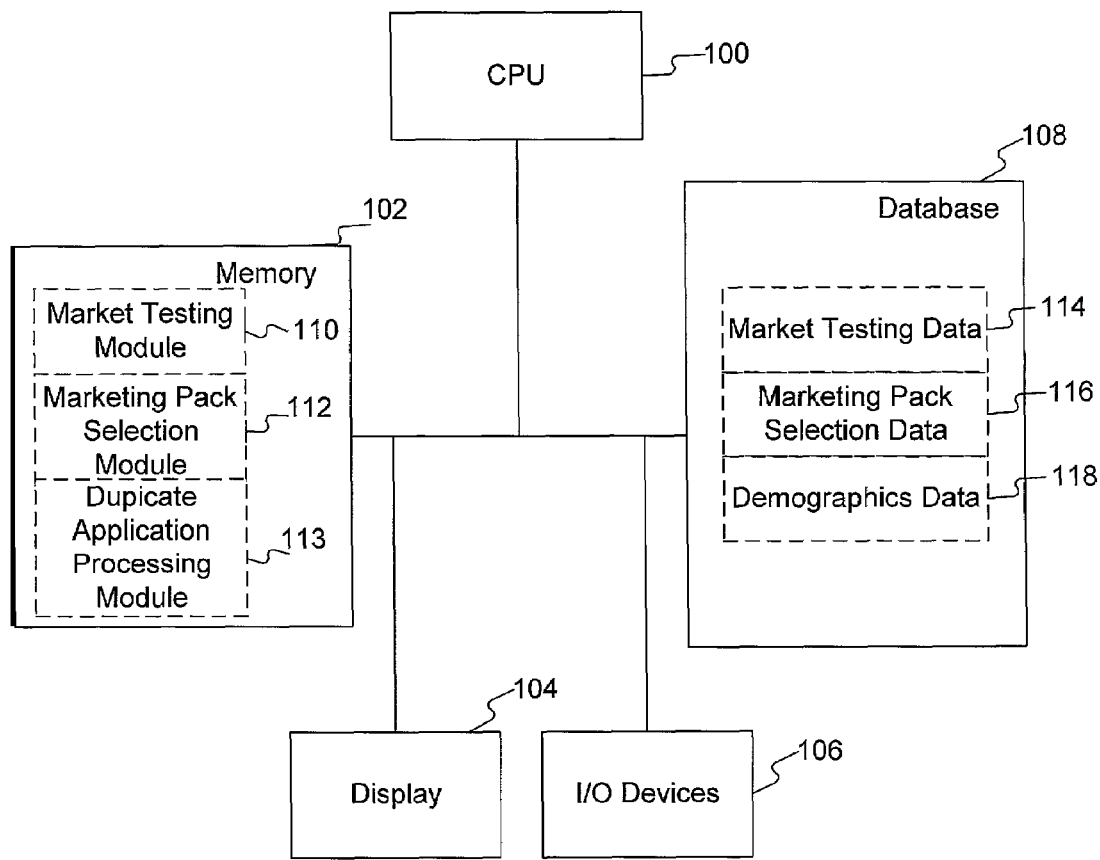
FIG. 1 illustrates an exemplary system environment, consistent with embodiments of the present invention.

Systems and methods consistent with embodiments of the present invention increase market penetration by using complementary marketing of financial products and services. For example, systems and methods consistent with embodiments of the invention offer a group of consumers a financial product or service using two different marketing packs. The first and second marketing packs may be selected such that the first marketing pack is preferred by a majority of the population of consumers, whereas the second marketing pack is different from the first marketing pack and/or preferred by a minority of the consumer population. The differences between the marketing packs may be based on changes in the attributes of the marketing packs, such as the size, the degree of stealthiness, the degree of simplicity, the degree of conciseness, and the degree of personalization of the marketing pack and its contents. By using different marketing packs, the response rate by consumers to an offer for a financial product or service may be enhanced. This is because the two marketing packs result in not only the majority of consumers (who prefer one of the marketing packs) being responsive to the offer, but also the minority of consumers (who prefer the other marketing pack) is captured by the offer. In order to maximize the responsiveness to such offers, systems and methods consistent with embodiments of the invention may determine the degree of marketing distance (i.e., the difference in positioning of the marketing packs) to control the selection and/or manner in which marketing packs are sent to consumers.

Embodiments of the invention relate not only to offering complementary marketing packs for a financial product or service, but also relate to systems and methods for offering complementary financial products or services. For example, a first financial product and a second financial product may be offered to a group of consumers, where the first financial product or service is preferred by a majority of consumers and the second financial product is different from the first financial product and/or preferred by a minority of the consumer population. By offering these complementary products or services, systems and methods consistent with embodiments of the invention maximize revenue by improving the response rate and providing better market penetration.

Embodiments of the invention may be implemented in various system or network environments. Such environments and applications may be specially constructed for performing the various processes and operations of the embodiments of the invention or they may include a general-purpose computer or computing platform selectively activated or reconfigured by program code to provide the necessary functionality. The systems and methods disclosed herein are not inherently related to any particular computer or other apparatus, and may be implemented by a suitable combination of hardware, software, and/or firmware. For example, various general-purpose machines may be used with programs written in accordance with teachings of the embodiments of the invention, or it may be more convenient to construct a specialized apparatus or system to perform the required methods and techniques. Embodiments of the invention also relate to computer readable media that include program instruction or program code for performing various computer-implemented operations based on the methods and processes of the embodiments. The media and program instructions may be those specially designed and constructed for the purposes of the embodiments of the invention, or they may be of the kind well known and available to those having skill in the computer software arts. Examples of program instructions include both machine code, such as produced by compiler, and files containing a high level code that can be executed by the computer using an interpreter.

FIG. 1 is an illustration of an exemplary system environment, consistent with embodiments of the present invention. As shown in FIG. 1, the exemplary system may include a CPU 100, a memory 102, a display 104, I/O devices 106, and database 108. As shown in FIG. 1, memory 102 may include a market testing module 110 and a marketing pack selection module 112, which when executed by CPU 100 provides functionality associated with embodiments of the invention. Memory 102 may also include a duplicate application processing module 113, which when executed by CPU 100 provides additional functionality associated with embodiments of the invention. Although FIG. 1 depicts only one CPU, one skilled in the art will appreciate that other processors may be used as part of the system.

Database 108, which is connected to other parts of the exemplary system of FIG. 1, may be implemented with a storage device, such as a high-density memory or storage device. Database 108 includes market testing data 114, marketing pack selection data 116, and demographics data 118. Additionally, database 108 may be either directly connected to the rest of the system, or it may be indirectly connected via a communication network, such as a local area network, or the Internet. Also, the data residing in database 108 may be distributed over various databases or tables.

Market testing data 114 may include data related to the preferences of a test group of consumers with respect to various attributes of a marketing pack or financial product or service. Tables related to this data may be used to test the efficacy of various marketing packs and financial products. Marketing pack selection data 118 may include data corresponding to the values of the various attributes of the different marketing packs. Demographics data 118 may include data concerning the age, gender, median income, and other census related data. This data may be used to target specific types of marketing packs or financial products or services to a subset of the general consumer population. Thus, for example, if market testing indicates that younger consumers prefer higher credit limits, but do not mind paying annual fees, then they may be marketed products (such as credit cards) that meet this criteria.

FIG. 2 is an illustration of an exemplary marketing pack selection table 200, consistent with embodiments of the present invention. Table 200 may reside in a database, such as database 116 of FIG. 1, and/or be part of a relational database. Marketing pack selection table 200 may contain, for example, information concerning different types of marketing packs or envelopes for consumers. Marketing pack selection table 200 may contain values corresponding to the various attributes associated with a marketing pack. Such attributes include, but are not limited to, the ones depicted in FIG. 2. An operator may create such a table by designing various marketing packs, such as A, B, C, D, and E, which are listed in FIG. 2. This table may be used by marketing pack selection module 112 to select the various marketing packs consistent with embodiments of the invention.

As illustrated in FIG. 2, table 200 may be structured with several rows and columns of information. For example, a column 210 may be provided in table 200 to indicate the different types of marketing packs. By way of illustration, such marketing pack types may include a marketing pack type "A" 212, type "B" 214, type "C" 216, type "D" 218, and/or type "E" 220. Each one of these marketing pack types may have specific attributes associated with it. For this purpose, a number of attribute columns may also be provided in table 200. For example, a size column 230 may be provided to indicate the size of the envelope. In addition, a degree of stealthiness column 240 may be provided to indicate the degree of stealthiness of the envelope (i.e., the degree to which the cover or contents of the marketing pack or envelope indicates to the consumer the nature, source and/or terms of the financial product or service that is being offered). Further, a degree of simplicity column 250 may be provided in table 200. Column 250 may include data that indicates the degree to which the marketing pack or envelope is colorful and/or elaborate. Other columns in table 200 may be provided to indicate attributes related to the text and contents of the marketing pack or envelope. For example, a degree of conciseness column 260 may be provided to indicate the degree to which the message printed on the marketing pack and/o provided in the contents of the pack is concise in nature or verbose. Also, a degree of personalization column 270 may be provided to indicate the degree to which the marketing message is tailored or directed to a particular individual or group of consumers. One skilled in the art will appreciate that marketing pack selection table 200 may include information concerning other attributes associated with both the marketing pack and its contents.

As further illustrated in FIG. 2, each row of table 200 provides information concerning the specific attributes of each type of marketing packs (i.e., there is an associated row for type A, B, C, D, and E). The information concerning each attribute may be stored as a numerical value or scale factor. For example, marketing pack type A in FIG. 2 has a value of 2 corresponding to its size, a value of −7 corresponding to its degree of stealthiness, a value of 1 corresponding to its degree of simplicity, a value of 2 corresponding to its degree of conciseness, and a value of 8 corresponding to its degree of personalization. Each of these values express in relative terms the values of the various attributes associated with the marketing packs. To have an objective comparison, a scale may be used, such as a scale of −10 to 10 for the degree of stealthiness, where −10 may indicate the lowest degree of stealthiness and +10 may indicate the highest degree of stealthiness. One skilled in the art will appreciate in addition to numerical values and scale factors, other means of expressing relative values of the attributes associated with each marketing pack type may also be used in table 200.

Figure 3:
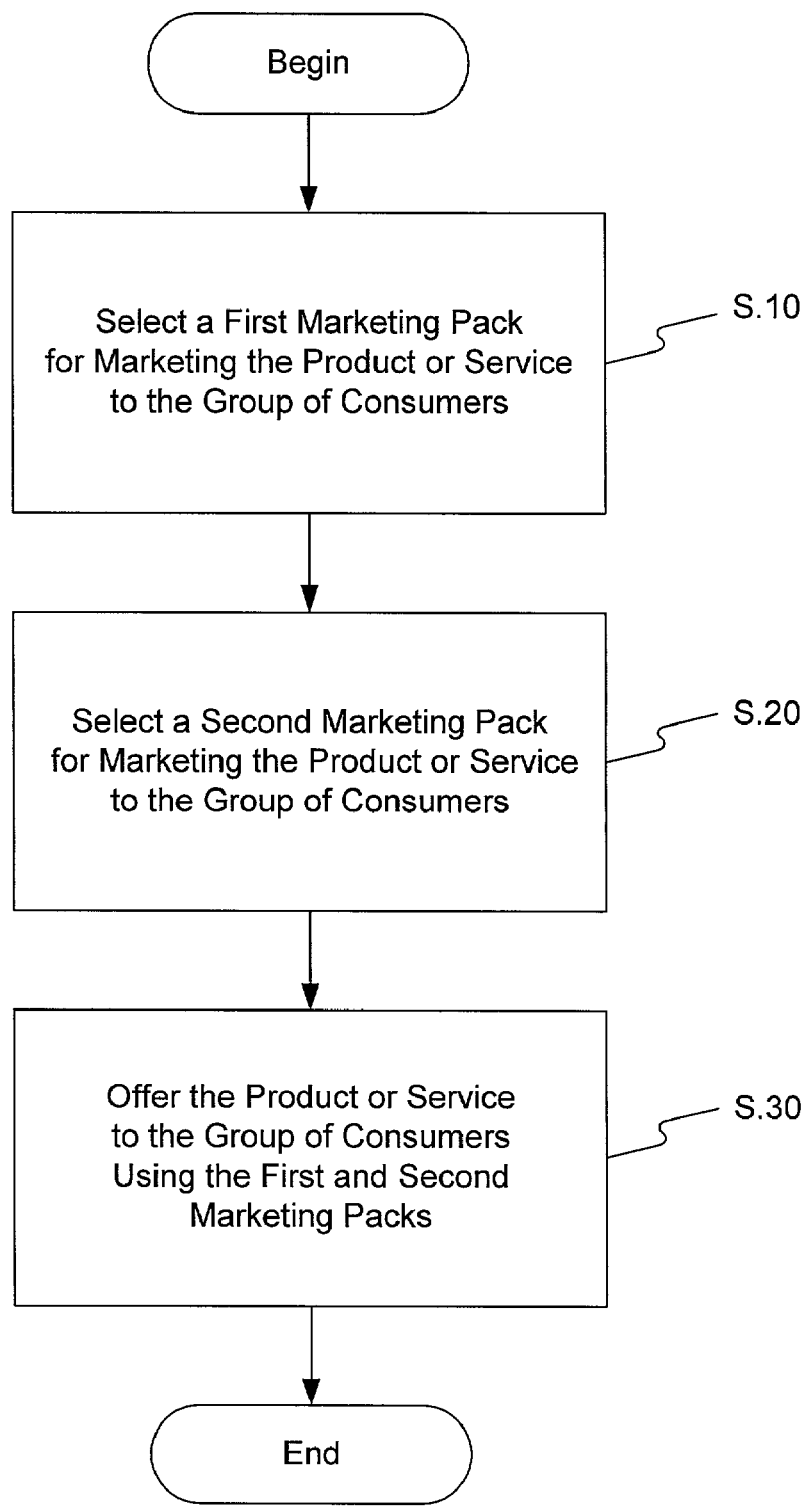
FIG. 3 is an exemplary flowchart for offering a financial product or service to a group of consumers, consistent with embodiments of the present invention.

FIG. 3 depicts an exemplary flowchart for offering a financial product or service to a group of consumers, consistent with embodiments of the present invention. The features and functionality of this exemplary flowchart may be implemented by market testing module 110 and marketing pack selection module 112 of FIG. 1, when executed by CPU 100. As shown in FIG. 3, the process begins by selecting a first marketing pack for marketing a financial product or service to a group of consumers (step S.10). This step may include, for example, selecting a first marketing pack for marketing a financial product or service to a group of consumers, wherein the first marketing pack has a first value for at least one marketing pack attribute. Alternatively, this step may include selecting a first marketing pack for marketing a financial product or service to a group of consumers, wherein the first marketing pack has one or more corresponding values for a plurality of marketing pack attributes. An exemplary table depicting a plurality of marketing pack attributes is shown in FIG. 2.

As part of step S.10 in FIG. 3, market testing module 110 may be used to conduct testing and gather market testing data 114. Market testing may be conducted using focus groups or by mailing different marketing packs to a subset of randomly selected population. One skilled in the art will appreciate that other market testing techniques may be used to gather information concerning preferences associated with the various attributes of a marketing pack. In order to ensure the reliability of the market testing process, the test population may be selected to ensure that the first marketing pack is sent to a group of consumers who have a similar response rate to another randomly selected group of consumers who will be sent the second marketing pack. Further, demographics data 118 may be used to identify a specific marketing pack out of a possible set of second marketing packs, such that the largest number of consumers are likely to accept the offered financial product or service when it is offered simultaneously using the first marketing pack and the identified specific marketing pack.

Having selected a first marketing pack, the next step involves selecting a second marketing pack (step S.20). The second marketing pack that is selected may have a second value for the at least one marketing pack attribute. To provide complementary marketing packs, the second marketing pack may be selected such that a difference between the first value and the second value satisfies a predetermined marketing distance criteria. In one embodiment of the present invention, the second marketing pack may be positioned in a way that it is likely to appeal to a group of consumers who will normally not respond to the offer made via the first marketing pack. As disclosed later herein, the second marketing pack may be selected based on the marketing distance between the first marketing pack and the second marketing pack. One skilled in the art will appreciate that other techniques and methods may also be used to determine the attributes associated with the second marketing pack such that a different group of consumers from the majority of the consumers would be responsive to the second marketing pack. As discussed above, market-testing techniques may be used to identify the attributes associated with the second marketing pack.

Having selected the first marketing pack and the second marketing pack, the financial product or service is offered to the group of consumers (step S.30). Consistent with embodiments of the invention, a financial product or service may be offered to the group of consumers using the first marketing pack and the second marketing pack. The financial product or service may be a credit card account, a savings or checking account, an installment or personal loan, an investment or brokerage service, or any other financial product or service. Further, the financial product or service may be offered through various channels of communication, including direct marketing, marketing over the Internet, or other means for communicating and offering financial products or services.

In accordance with an embodiment of the invention, the financial product or service may be offered simultaneously using both the first marketing pack and the second marketing pack. In other embodiments, however, the second marketing pack may be used to offer the financial product or service after a predetermined time has elapsed from the time when the financial product or service was offered using the first marketing pack. For the purposes of this invention, the second marketing pack may typically be used to offer the product or service within a period of less than a week from the time when the first marketing pack was used to offer the financial product or service. Using market testing data (such as market testing data 110 of FIG. 1), such timing issues may be optimized. Thus, for example, if the market test data reveals that offering the marketing packs simultaneously results in a higher overall response rate from the targeted population, then the financial product or service may be offered simultaneously using the first marketing pack and the second marketing pack. Alternatively, if the market test data reveals that offering the financial product or service using a predetermined time period results in a higher overall response rate from the targeted population, then the financial product may be offered with the first marketing pack and then, after the predetermined time period, with the second marketing pack.

Figure 4:
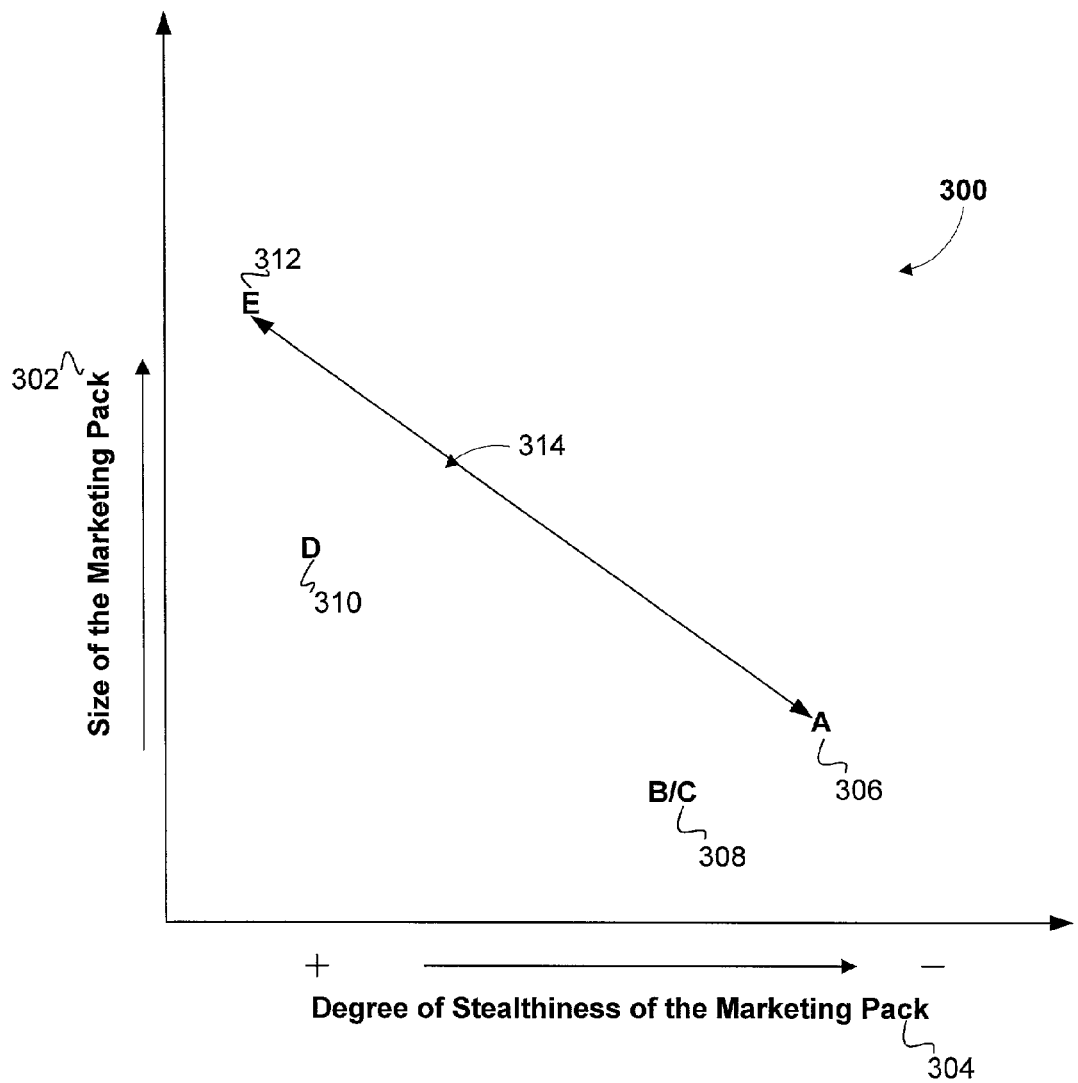
FIG. 4 is an exemplary two-dimensional plot for determining the positioning distance between different marketing packs or financial products or services, consistent with embodiments of the present invention.

FIG. 4 depicts an exemplary two-dimensional graph or plot for selecting a first marketing pack and a second marketing pack, consistent with embodiments of the invention. As discussed with respect to FIG. 2, there may be different types of marketing packs, and each marketing pack type may have several attributes associated with it. For example, table 200 of FIG. 2 shows five different types of marketing packs (types A, B, C, D and E) with five different attributes. In one embodiment of the invention, the various attributes associated with different marketing packs may be plotted in a two-dimensional or a multi-dimensional space, and the distance between each marketing pack may be measured and/or displayed.

FIG. 4, for example, depicts marketing packs A, B, C, D, and E, plotted on a two-dimensional graph or plot 300 corresponding to two attributes of interest; namely, the size of the marketing pack 302 and degree of stealthiness of the marketing pack 304. Line 314 depicts a marketing distance between two specific marketing packs; namely, marketing pack A 306 and marketing pack E 312. This marketing distance may be calculated by summing the vector distance between each type of marketing pack along the X axis and the Y axis, respectively.

In FIG. 4, marketing pack D 310 and marketing packs B and C are also plotted on the exemplary two-dimensional graph for illustrative purposes. These plots may permit the marketing distance between other combinations of marketing packs to be determined relative to the same or different sets of attributes. Further, in accordance with embodiments of the invention, the marketing distance between every combination of marketing packs may be determined, and the combination of two marketing packs that provides the greatest marketing distance may be selected for marketing the product or service to consumers. Additionally, one skilled in the art will appreciate that although FIG. 4 depicts a two-dimensional graph for determining the positioning distance between two marketing packs, multi-dimensional analysis and viewing techniques may be used to determine the positioning distance between two marketing packs. Thus, for example, data mining techniques may be used to determine the optimum positioning distance between the two marketing packs.

In one embodiment consistent with the present invention, the optimum distance between the two marketing packs may be used as a predetermined distance criteria. As shown, in FIG. 4, where marketing packs are plotted based on two attributes, the predetermined marketing distance criteria may be the largest distance between the two marketing packs. The distance between two marketing packs may be calculated using the Pythagorean theorem. As discussed above, marketing packs may be plotted in a multi-dimensional space, and the marketing distance between them may be measured. Other techniques, for example, setting a predetermined marketing criteria based on judgment and experience may also be used. In other words, the predetermined marketing distance criteria is merely a way of capturing the complementary nature of the marketing packs at issue.

To determine an optimum marketing distance, demographics data 118 may be used. For example, where more than one marketing pack satisfied a predetermined marketing distance criteria, demographics data 118 may be used to select a finalist. That is, if demographics data indicates a preference for one of the marketing packs that meets the predetermined marketing distance criteria, then that marketing pack may be used to target the group of consumers that fit a particular demographic profile. For example, if market testing reveals that younger and wealthier consumers prefer a certain type of marketing pack, then that marketing pack may be selected and targeted at that subset of population.

Figure 7:
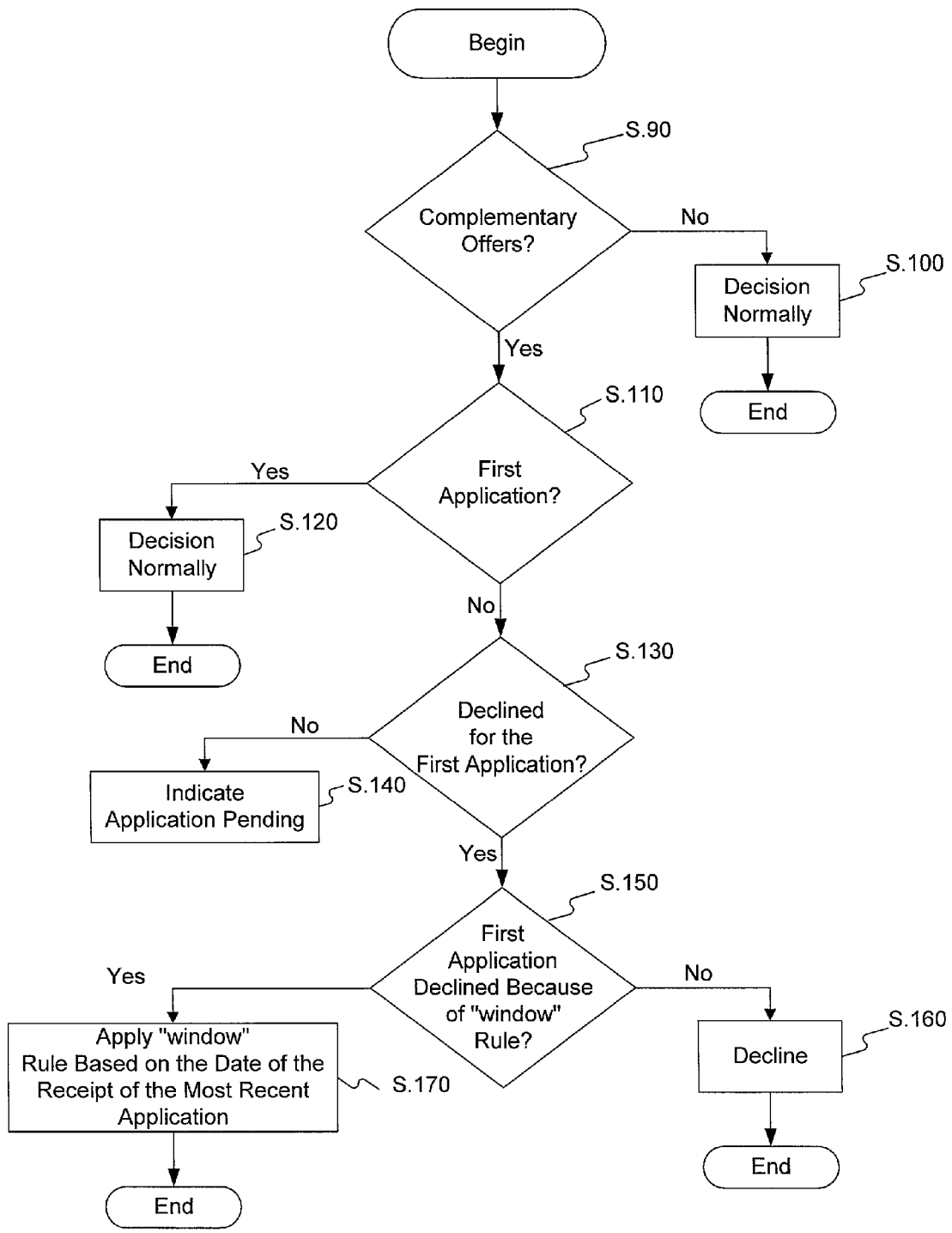
FIG. 7 is an exemplary flowchart for handling duplicated applications, consistent with embodiments of the present invention.

Another embodiment of the present invention, relates to handling duplicate applications for the offered financial product or service. In particular, it relates to a process for handling duplicate applications for a financial product or service when the financial product or service is double marketed, i.e., offered via two marketing packs. Traditionally, entities, such as banks that offer financial products or services, tend to deny a duplicate application for the same financial product, when the duplicate application is received within a time window, based on a window rule. Thus, for example, a bank may deny a second application for a credit card, when the second application is received within 45 days of the receipt of the first application for the same credit card by the same applicant. Complementary marketing, however, may involve sending two applications to an applicant, and in some instances an applicant may apply using both applications. FIG. 7 depicts a flow chart for handling such duplicate applications. The steps consistent with the process for handling duplicated applications may be executed by duplicate application processing module 113, shown in FIG. 1, by using the CPU and data entry from an agent or operator associated with a bank, for example.

As shown in FIG. 7, once an application is received for a financial product or service, duplicate application processing module 113 may first prompt an operator of the system to determine whether the application was received from an applicant who was sent complementary offers (step S.90). If not, then the application is processed normally (S.100). For example, a credit history check may be performed, as well as other processing associated with, for example, issuance of a credit card. If the application was received from an applicant, who was sent complementary offers, then duplicate application processing module 113 may prompt the operator to determine whether it is a first application (step S.110). If yes, then the application is processed normally (step S.120). If the received application is not a first application, then in the next step it is determined whether the applicant was denied on the basis of the first application (step S.130). If not, then the applicant may be notified that an application is already pending (step S.140). If the applicant was declined based on the first application, then duplicate application processing module 113 may determine whether the first application was denied because of a "window rule" (step S.150). A window rule may provide a window of time during which if two applications are received then the second application is denied. The window of time may range from a few days to a few months, for example. If the first application was not denied based on a window rule, then the second application is declined or denied (step S.160). This is because, since the first application was not denied on the basis of the window rule, it was most likely denied because of poor credit history, for example. One skilled in the art will appreciate that consistent with the present invention, as part of this step, the reason for which the first application was declined may be assessed or verified. If the first application was denied because of a window rule, then a window rule may be applied to the second application based on the most recent application that was received from the applicant (step S.170). This prevents, for example, declining the second application based on the window rule again and permits a bank or other entity to process the second application.

As discussed earlier, the present invention relates not only to offering a financial product or service using a first marketing pack and a second marketing pack, but also relates to offering a first financial product or service and a second financial product or service to a group of consumers. By way of non-limiting examples, FIG. 5 illustrates an exemplary financial product selection table 500 and FIG. 6 illustrates an exemplary flowchart for offering financial products or services to consumers, consistent with embodiments of the invention.

As shown in FIG. 5, each row of table 500 provides information concerning the specific attributes of each type of financial product or service (i.e., there is an associated row for type "AA" 512, type "BB" 514, and type "CC" 516). Each type of financial product or service 510 may have several attributes associated with it. Thus, for example, if the financial product or service is a credit card, the credit card may have an annual percentage rage ("APR") 530, a credit limit 540, an annual fee 550, a reward type 560, and a payment date 570 associated with it. For example, financial product AA 512 has an APR of 6%, a credit limit of $5,000, an annual fee of $30, airline mileage as reward type 560, and a payment date 570 on first day of every month. Table 500 is merely exemplary and other attributes and values may also be associated with a financial product or service. Similarly, for other financial products or services (such as checking accounts, installment loans, investment services, etc.) other attributes and respective values may be associated in accordance with embodiments of the invention.

Figure 6:
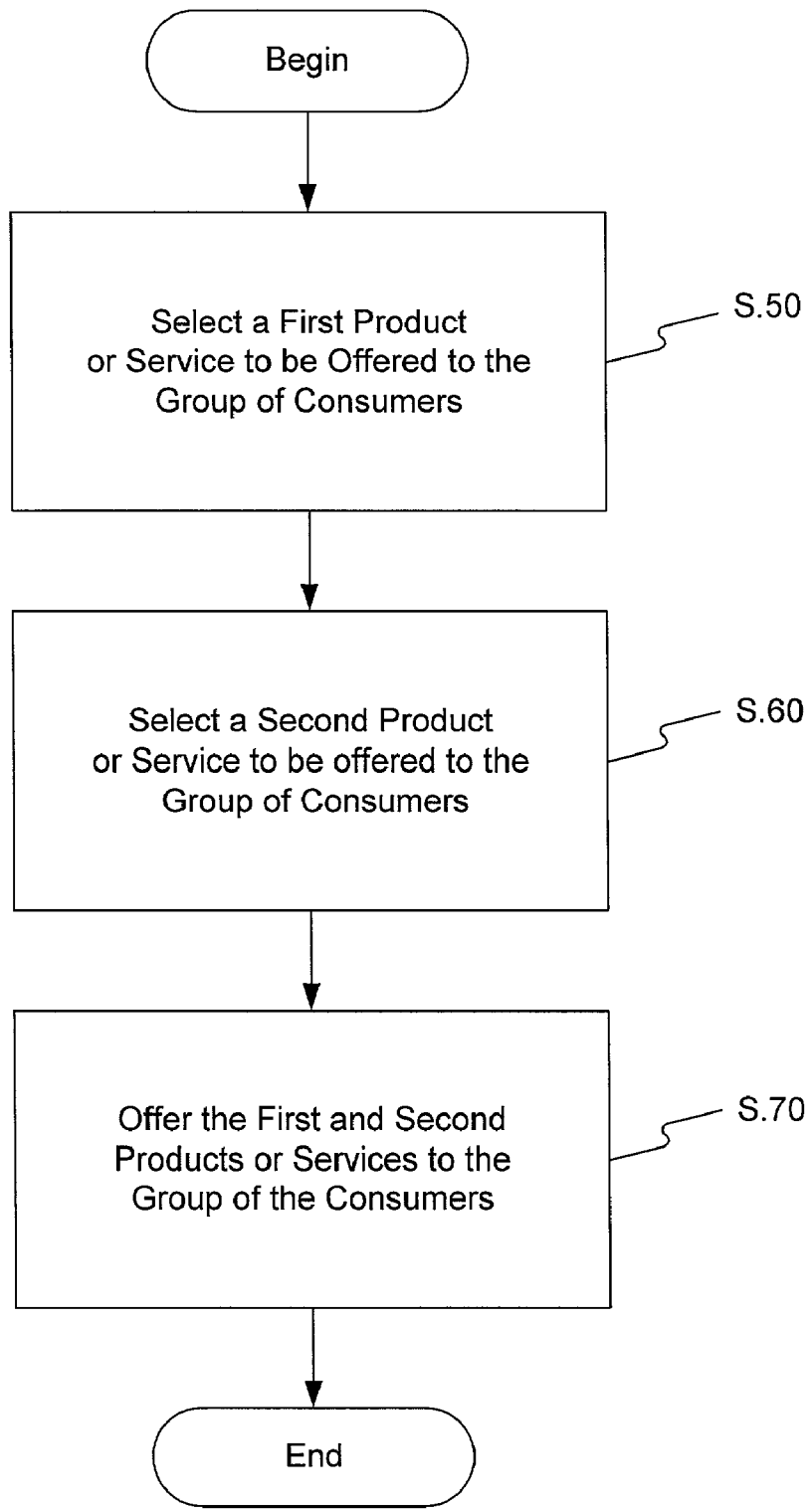
FIG. 6 is an exemplary flowchart for offering a first financial product or service and a second financial product or service to a group of consumers, consistent with embodiments of the present invention.

As shown in FIG. 6, the process begins by selecting a first financial product or service to be offered to a group of consumers (step S.50). This step involves, for example, selecting a financial product or service, where the first financial product or service has a first value for at least one financial product or service attribute. All of the techniques and steps described above with respect to selecting a first marketing pack may similarly be used as part of step S.50, albeit by relying on the attributes associated with the financial product or service at issue. Thus, for example, instead of using table 200 shown in FIG. 2, table 500 shown in FIG. 5 may be used.

Having selected a first financial product or service to be offered to a group of consumers, the next step involves selecting a second financial product or service (step S.60). The second financial product or service that is selected may have a second value for the at least one financial product or service attribute such that a difference between the first value and the second value satisfies a predetermined marketing distance criteria. A predetermined marketing distance may be set using any of the techniques discussed earlier with respect to setting the predetermined marketing distance criteria for marketing packs. As part of this step, all of the techniques and methods described above with respect to selecting a second marketing pack may similarly be used to selected the second financial product or service. Thus, a two-dimensional graph similar to FIG. 4 may be used to select the second financial product or service and/or determine the optimum marketing distance. Of course, some modifications of the above-described techniques may be required. For example, instead of relying on data related to the marketing packs, data related to financial products or services may be used. One skilled in the art will appreciate that other techniques and methods may also be used to determine the attributes associated with the second financial product or service such that a different group of consumers from the majority of the consumers would be responsive to the second financial product or service.

Having selected the first and second financial products or services, the two financial products or services are then offered to the group of consumers (step S.70). As indicated above, various types of financial products or services may be offered. For example, each financial product or service may be a credit card account, a savings or checking account, an installment or personal loan, an investment or brokerage service, or any other financial product or service. Further, the financial products or services may be offered through various channels including direct marketing, marketing over the Internet, or other means of offering financial products.

In one embodiment consistent with the present invention, the financial products may be offered simultaneously. In another embodiment, however, the second financial product or service may be offered after a predetermined time period has elapsed from the time when the first financial product or service was offered. For the purposes of this invention, the second product or service may typically be offered within a period of less than a week from the time when the first financial product or service was offered. Using market testing data (such as market testing data 114 of FIG. 1), such timing issues may be optimized. Thus, for example, if the market testing data reveals that offering the financial products simultaneously results in a higher overall response rate from the targeted population then the financial products may be offered simultaneously.

Other modifications and embodiments of the invention will be apparent to those skilled in the art from consideration of the specification and practice of the invention disclosed herein. For example, one skilled in the art will appreciate that the systems and methods consistent with the present invention may be distributed among various components over various computers. Further, although embodiments of the invention have been described herein with reference to financial products or services, systems and methods consistent with the invention may also be adapted for marketing and offering other types of products or services to consumers.

Therefore, it is intended that the specification and examples be considered as exemplary only, with a true scope and spirit of the invention being indicated by the following claims.

What is claimed is:

1. A method for offering a financial product or service to a group of consumers, the method comprising:

storing, in a computer storage device, information representing a plurality of marketing packs and a predetermined marketing distance, wherein each of the plurality of marketing packs consists of a common set of marketing pack attributes and where each attribute is assigned a value, thereby providing a set of values for each marketing pack;

determining, by a computer processor, consumer response rates to the plurality of marketing packs;

selecting, by the computer processor and from the computer storage device, a first marketing pack from the plurality of marketing packs, the first marketing pack being associated with a consumer response rate higher than a threshold;

determining, by the computer processor, a plurality of marketing distances between the first marketing pack and a plurality of remaining marketing packs using a multi-dimensional analysis with each dimension corresponding to a marketing pack attribute, wherein each marketing distance is indicative of a difference between the set of values associated with one of the remaining plurality of marketing packs and the first set of values associated with the first marketing pack;

selecting, by the computer processor from the computer storage device, a second marketing pack based on the plurality of marketing distances determined, such that the marketing distance between the first marketing pack and the second marketing pack is no less than the predetermined marketing distance; and concurrently offering the financial product or service to the group of consumers using the first marketing pack and the second marketing pack.

2. The method of claim 1, wherein the financial product is a credit card account.

3. The method of claim 1 wherein the financial product is an installment loan.

4. The method of claim 1, further comprising:

receiving at least two applications in response to the offers for the product or service; and determining whether the first application was declined because of a window rule:
  if not, then declining the second application;
  if yes, then applying the window rule to the second application based on the date of the most recently received application.

5. The method of claim 1, wherein the marketing distance is calculated using the multi-dimensional analysis according to a Pythagorean theorem.

6. A method for offering a financial product or service to a group of consumers, the method comprising:
  storing, in a computer storage device, information representing a plurality of marketing packs and a predetermined marketing distance, wherein each of the plurality of marketing packs consists of a common set of marketing pack attributes and where each attribute is assigned a value, thereby providing a set of values for each marketing pack;
  selecting, by a computer processor and from the computer storage device, a first marketing pack from the plurality of marketing packs;
  determining, by the computer processor, a plurality of marketing distances between the first marketing pack and a plurality of remaining marketing packs using a multi-dimensional analysis with each dimension corresponding to a marketing pack attribute, wherein each marketing distance is indicative of a difference between the set of values associated with one of the remaining plurality of marketing packs and the first set of values associated with the first marketing pack;
  selecting, by the computer processor from the computer storage device, a second marketing pack based on the plurality of marketing distances determined, such that the marketing distance between the first marketing pack and the second marketing pack is no less than the predetermined marketing distance; and
  concurrently offering the financial product or service to the group of consumers using the first marketing pack and the second marketing pack.

7. The method of claim 6, wherein selecting a first marketing pack includes:
  obtaining market test data concerning preferences of the group of consumers with respect to the set of marketing pack attributes for the first marketing pack.

8. The method of claim 6, wherein selecting a second marketing pack includes:
  obtaining market test data concerning preferences of the group of consumers with respect to the set of marketing pack attributes for the second marketing pack.

9. The method of claim 6, wherein the set of marketing pack attributes include at least one of a size of the marketing pack, a stealthiness of the marketing pack, a simplicity of the marketing pack, a conciseness of the marketing message, and a personalization of the marketing message.

10. The method of claim 6, wherein the marketing distance is calculated using the multi-dimensional analysis according to a Pythagorean theorem.

11. A method for offering a first financial product and a second financial product to a group of consumers, the method comprising:
  storing, in a computer storage device, information representing a plurality of financial products and a predetermined marketing distance, wherein each of the plurality of financial products consists of a common set of financial product attributes and where each attribute is assigned a value, thereby providing a set of values for each financial product;
  selecting, by a computer processor and from the computer storage device, a first financial product to be marketed to the group of consumers from the plurality of financial products;
  determining, by the computer processor, a plurality of marketing distances between the first financial product and a plurality of remaining financial products using a multi-dimensional analysis with each dimension corresponding to a financial product attribute, wherein each marketing distance is indicative of a difference between the set of values associated with one of the remaining plurality of financial product and the first set of values associated with the first financial product;
  selecting, by the computer processor from the computer storage device, a second financial product based on the plurality of marketing distances determined, such that the marketing distance between the first financial product and the second financial product is no less than the predetermined marketing distance; and
  concurrently offering the first financial product and the second financial product to the group of consumers.

12. The method of claim 11 wherein the first financial product is a credit card account and the second financial product is a credit card account.

13. The method of claim 11, wherein the first financial product is an installment loan and the second financial product is an installment loan.

14. The method of claim 11, wherein the set of financial product attributes include an annual percentage rate of the financial product, a credit line associated with the financial product, and an annual fee associated with the financial product.

15. The method of claim 11, wherein selecting a first financial product includes:
  testing a market containing the group of consumers to obtain market test data concerning preferences of the group of consumers with respect to corresponding values for at least one of the set of financial product attributes of the first financial product.

16. The method of claim 11, wherein selecting a second financial product includes:
  testing a market containing the group of consumers to obtain market test data concerning preferences of the group of consumers with respect to corresponding values for at least one of the set of financial product attributes of the second financial product.

17. The method of claim 11, wherein the marketing distance is calculated using the multi-dimensional analysis according to a Pythagorean theorem.

18. A system for offering a financial product or service to a group of consumers, the system comprising:
  a database containing information representing a plurality of marketing packs and a predetermined marketing distance, wherein each of the plurality of marketing packs consists of a common set of marketing pack attributes and where each attribute is assigned a value, thereby providing a set of values for each marketing pack;
  a memory, operatively coupled to the database, containing a marketing pack selection module;
  a processor operatively coupled to the memory and to the database to perform instructions contained in the marketing pack selection module to form operations comprising:
    determine consumer response rates to the plurality of marketing packs;

select a first marketing pack from the plurality of marketing packs, the first marketing pack being associated with a consumer response rate higher than a threshold;

determine a plurality of marketing distances between the first marketing pack and a plurality of remaining marketing packs using a multi-dimensional analysis with each dimension corresponding to a marketing pack attribute, wherein each marketing distance is indicative of a difference between the set of values associated with one of the remaining plurality of marketing packs and the first set of values associated with the first marketing pack;

select a second marketing pack based on the plurality of marketing distances determined, such that the marketing distance between the first marketing pack and the second marketing pack is no less than the predetermined marketing distance; and concurrently offer the financial product or service to the group of consumers using the first marketing pack and the second marketing pack.

19. The system of claim 18, further comprising:

a market testing module adapted to analyze market testing data stored in the database to obtain preferences of the group of consumers with respect to the set of marketing pack attributes.

20. The system of claim 18, wherein the financial product is one of a credit card or an installment loan.

21. A method for offering a financial product or service to a group of consumers, the method comprising:

storing, in a computer storage device, information representing a plurality of marketing packs and a predetermined marketing distance, wherein each of the plurality of marketing packs consists of a common set of marketing pack attributes and where each attribute is assigned a value, thereby providing a set of values for each marketing pack;

determining, by a computer processor, consumer response rates to the plurality of marketing packs;

selecting, by the computer processor and from the computer storage device, a first marketing pack from the plurality of marketing packs, the first marketing pack being associated with a consumer response rate higher than a threshold;

determining, by the computer processor, a plurality of marketing distances between the first marketing pack and a plurality of remaining marketing packs using a multi-dimensional analysis with each dimension corresponding to a marketing pack attribute, wherein each marketing distance is indicative of a difference between the set of values associated with one of the remaining plurality of marketing packs and the first set of values associated with the first marketing pack;

selecting, by the computer processor from the computer storage device, a set of second marketing packs based on the plurality of marketing distances determined, such that the marketing distance between the first marketing pack and each of the set of second marketing packs is no less than the predetermined marketing distance;

identifying, by the computer processor, a specific marketing pack out of the set of second marketing packs based on demographic data so that a majority of consumers accept the offered financial product or service when being concurrently offered the first marketing pack and the identified specific marketing pack; and concurrently offering the financial product or service to the group of consumers using the first marketing pack and the identified specific marketing pack.

22. The method of claim 21, wherein the product or service is offered using direct mail.

23. A system for offering a financial product or service to a group of consumers, the system comprising:

a database containing information representing a plurality of marketing packs and a predetermined marketing distance, wherein each of the plurality of marketing packs consists of a common set of marketing pack attributes and wherein each attribute is assigned a value, thereby providing a set of values for each marketing pack;

a memory, operatively coupled to the database, containing computer executable instructions;

a processor operatively coupled to the memory and to the database that executes the computer-executable instructions to perform operations comprising:

selecting a first market packet from the plurality of marketing packs;

determining a plurality of marketing distances between the first marketing pack and a plurality of remaining marketing packs using a multi-dimensional analysis with each dimension corresponding to a marketing pack attribute, wherein each marketing distance is indicative of the set of values associated with one of the remaining plurality of marketing packs and the first set of values associated with the first marketing pack;

selecting a second marketing pack based on the plurality of marketing distances determined, such that the marketing distance between the first marketing pack and the second marketing pack is no less than the predetermined marketing distance; and concurrently offering the first marketing pack and the second marketing pack to the group of consumers.

24. A system for offering a first financial product and a second financial product to a group of consumers, the system comprising:

a database containing information representing a plurality of financial products and a predetermined marketing distance, wherein each of the plurality of financial products comprises a common set of financial product attributes and wherein each attribute is assigned a value, thereby providing a set of values for each financial product;

a memory, operatively coupled to the database, containing computer-executable instructions;

a processor operatively coupled to the memory and to the database that executes the computer-executable instructions to perform operations comprising:

selecting a first financial product to be marketed to the group of consumers from the plurality of financial products;

determining a plurality of marketing distances between the first financial product and a plurality of remaining financial products using a multi-dimensional analysis with each dimension corresponding to a financial product attribute, wherein each marketing distance is indicative of a difference between the set of values associated with one of the remaining plurality of financial products and the first set of values associated with the first financial product;

selecting a second financial product based on the plurality of marketing distances determined, such that the marketing distance between the first financial product and the second financial product is no less than the predetermined marketing distance; and concurrently offering the first financial product and the second financial product to the group of consumers.

25. A computer-readable medium storing instructions, wherein the instructions, when executed by a computer, perform a method for offering a financial product or service to a group of consumers, the method comprising:

determining consumer response rates to a plurality of marketing packs;

selecting a first marketing pack from the plurality of marketing packs, wherein each of the plurality of marketing packs consists of a common set of marketing pack attributes and where each attribute is assigned a value, thereby associating a set of values to each marketing pack, the first marketing pack being associated with a consumer response rate higher than a threshold;

determining a plurality of marketing distances between the first marketing pack and a plurality of remaining marketing packs using a multi-dimensional analysis with each dimension corresponding to a marketing pack attribute, wherein each marketing distance is indicative of a difference between a set of values associated with one of the remaining plurality of marketing packs and the first set of values associated with the first marketing pack;

selecting a second marketing pack based on the plurality of marketing distances determined, such that the marketing distance between the first marketing pack and the second marketing pack is no less than a predetermined marketing distance; and concurrently offering the financial product or service to the group of consumers using the first marketing pack and the second marketing pack.

26. A computer-readable medium storing instructions, wherein the instructions, when executed by a computer, perform a method for offering a financial product or service to a group of consumers, the method comprising:

selecting a first marketing pack from a plurality of marketing packs, wherein each of the plurality of marketing packs consists of a common set of marketing pack attributes and where each attribute is assigned a value, thereby associating a set of values to each marketing pack;

determining a plurality of marketing distances between the first marketing pack and a plurality of remaining marketing packs using a multi-dimensional analysis with each dimension corresponding to a marketing pack attribute, wherein each marketing distance is indicative of a difference between a set of values associated with one of the remaining plurality of marketing packs and the first set of values associated with the first marketing pack;

selecting a second marketing pack based on the plurality of marketing distances determined, such that the marketing distance between the first marketing pack and the second marketing pack is no less than a predetermined marketing distance; and concurrently offering the financial product or service to the group of consumers using the first marketing pack and the second marketing pack.

27. A computer-readable medium storing instructions, wherein the instructions, when executed by a computer, perform a method for offering a first financial product and a second financial product to a group of consumers, the method comprising:

selecting a first financial product to be marketed to the group of consumers from a plurality of financial products, wherein each of the plurality of financial products consists of a common set of financial product attributes and where each attribute is assigned a value, thereby associating a set of values to each financial product;

determining a plurality of marketing distances between the first financial product and a plurality of remaining financial products using a multi-dimensional analysis with each dimension corresponding to a financial product attribute, wherein each marketing distance is indicative of a difference between the set of values associated with one of the remaining plurality of financial products and the first set of values associated with the first financial product;

selecting a second financial product based on the plurality of marketing distances determined, such that the marketing distance between the first financial product and the second financial product is no less than a predetermined marketing distance; and concurrently offering the first financial product and the second financial product to the group of consumers.

\* \* \* \* \*

UNITED STATES PATENT AND TRADEMARK OFFICE
CERTIFICATE OF CORRECTION

| | | |
|---|---|---|
| PATENT NO. | : 7,689,451 B2 | Page 1 of 1 |
| APPLICATION NO. | : 10/012381 | |
| DATED | : March 30, 2010 | |
| INVENTOR(S) | : Andrés Felipe Vives | |

It is certified that error appears in the above-identified patent and that said Letters Patent is hereby corrected as shown below:

Claim 11, col. 14, line 12, "product" should read -- products --.

Claim 23, col. 16, line 19, "market packet" should read -- marketing pack --.

Signed and Sealed this

Twelfth Day of October, 2010

David J. Kappos
*Director of the United States Patent and Trademark Office*